(12) United States Patent
Elisha et al.

(10) Patent No.: US 11,636,387 B2
(45) Date of Patent: Apr. 25, 2023

(54) SYSTEM AND METHOD FOR IMPROVING MACHINE LEARNING MODELS BASED ON CONFUSION ERROR EVALUATION

(71) Applicant: Microsoft Technology Licensing, LLC, Redmond, WA (US)

(72) Inventors: Oren Elisha, Hertzeliya (IL); Ami Luttwak, Binyamina (IL); Hila Yehuda, Tel Aviv (IL); Adar Kahana, Natanya (IL); Maya Bechler Speicher, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 409 days.

(21) Appl. No.: 16/773,153

(22) Filed: Jan. 27, 2020

(65) Prior Publication Data
US 2021/0232966 A1 Jul. 29, 2021

(51) Int. Cl.
*G06N 5/04* (2006.01)
*G06N 20/00* (2019.01)

(52) U.S. Cl.
CPC .............. *G06N 20/00* (2019.01); *G06N 5/04* (2013.01)

(58) Field of Classification Search
None
See application file for complete search history.

(56) References Cited

U.S. PATENT DOCUMENTS

| 5,720,003 | A  | * | 2/1998 | Chiang | ................ | H04L 41/16 |
| | | | | | | 706/11 |
| 6,751,600 | B1 | | 6/2004 | Wolin et al. | | |
| 8,954,358 | B1 | | 2/2015 | Zhang et al. | | |
| 9,449,283 | B1 | | 9/2016 | Purpura et al. | | |
| 11,321,629 | B1 | * | 5/2022 | Rowan | .................. | G06N 20/00 |

(Continued)

FOREIGN PATENT DOCUMENTS

CN 106874655 B 12/2018

OTHER PUBLICATIONS

"Confusion Matrix", Retrieved From: https://en.wikipedia org/w/index.php?title=Confusion_matrix&oldid=935615638, Jan. 13, 2020, 4 Pages.

(Continued)

*Primary Examiner* — James A Edwards
(74) *Attorney, Agent, or Firm* — Weaver IP L.L.C.

(57) ABSTRACT

Embodiments described herein are directed to improving machine learning (ML) model-based techniques for automatically labeling data items based on identifying and resolving labels that are problematic. An ML model may be trained to predict labels for any given data item. The ML model may be validated to determine a confusion metric with respect to each distinct pair of labels predicted by the ML model. Each confusion metric indicates how a particular label is being mistaken for another particular label. The confusion metrics are analyzed to determine whether any of the ML model-generated labels are problematic (e.g., a label conflicts with another label, a label that is rarely predicted, a label that is incorrectly predicted, etc.). Steps for resolving the problematic labels are implemented, and the ML model is retrained based on the resolution steps. By doing so, the ML model generates a more accurate label for a data item.

20 Claims, 6 Drawing Sheets

(56) References Cited

U.S. PATENT DOCUMENTS

| | | | |
|---|---|---|---|
| 2017/0075873 A1 | 3/2017 | Shetty et al. | |
| 2017/0161640 A1 | 6/2017 | Shamir | |
| 2018/0114142 A1 | 4/2018 | Mueller | |
| 2018/0240031 A1* | 8/2018 | Huszar | G06F 16/22 |
| 2018/0336362 A1 | 11/2018 | Guttmann | |
| 2019/0004920 A1 | 1/2019 | Vandriessche et al. | |
| 2019/0244348 A1* | 8/2019 | Buckler | G06N 20/00 |
| 2020/0019884 A1* | 1/2020 | McCourt, Jr. | G06F 17/18 |
| 2020/0034665 A1* | 1/2020 | Ghanta | G06N 20/00 |
| 2020/0118036 A1 | 4/2020 | Karnagel et al. | |
| 2020/0250270 A1 | 8/2020 | Yu et al. | |
| 2020/0257970 A1 | 8/2020 | Moon et al. | |
| 2020/0302340 A1* | 9/2020 | Durand | G06N 20/00 |
| 2020/0320440 A1* | 10/2020 | Ashani | G06N 20/20 |
| 2020/0349434 A1 | 11/2020 | Zhang et al. | |
| 2021/0249135 A1 | 8/2021 | Rimestad et al. | |
| 2021/0256419 A1 | 8/2021 | Elisha et al. | |
| 2021/0256420 A1 | 8/2021 | Elisha et al. | |

OTHER PUBLICATIONS

"International Search Report and Written Opinion Issued in PCT Application No. PCT/US20/066728", dated Mar. 29, 2021, 14 Pages.

Hijawi, et al., "EMFET: E-mail Features Extraction Tool", In Repository of arXiv:1711.08521, Nov. 22, 2017, 7 Pages.

"Predictive Intelligence", Retrieved From: https://www.servicenow.com/products/predictive-intelligence.html, Retrieved On: Jan. 7, 2020, 7 Pages.

Devlin, et al., "BERT: Pre-training of Deep Bidirectional Transformers for Language Understanding", In Repository of arXiv:1810 04805v1, Oct. 11, 2018, 14 Pages.

Miyato, et al., "Adversarial Training Methods for Semi-Supervised Text Classification", In Proceedings of 5th International Conference on Learning Representations, Apr. 24, 2017, 11 Pages.

Sallab, et al., "E-mail Classification Using Deep Networks", In Journal of Theoretical and Applied Information Technology, vol. 37, No. 2, Mar. 31, 2012, pp. 241-251.

Yang, et al., "XLNet: Generalized Autoregressive Pretraining for Language Understanding", In Repository of arXiv:1906.08237v1, Jun. 19, 2019, 18 Pages.

Kassani, et al., "k-Relevance Vectors: Considering Relevancy Beside Nearness", In the Repository of arXiv: 1909.08528, Sep. 18, 2019, 20 Pages.

Khurana, Udayan, "Automating Feature Engineering in Supervised Learning", Retrieved from: https://udayankhurana.com/wp-content/uploads/2018/07/FEbook-Chapter9.pdf, Mar. 14, 2018, pp. 115-137.

"International Search Report and Written Opinion Issued in PCT Application No. PCT/US21/014249", dated May 6, 2021, 13 Pages.

"International Search Report and Written Opinion Issued in PCT Application No. PCT/US21/014061", dated Apr. 23, 2021, 13 Pages.

"Non Final Office Action Issued in U.S. Appl. No. 16/795,353", dated Jun. 15, 2022, 10 Pages.

"Notice of Allowance Issued in U.S. Appl. No. 16/795,307", dated Aug. 5, 2022, 17 Pages.

Haq, et al., "Combining Multiple Feature-Ranking Techniques and Clustering of Variables for Feature Selection", In Journal of IEEE Access, Oct. 16, 2019, pp. 151482-151492.

"Notice of Allowance Issued in U.S. Appl. No. 16/795,353", dated Sep. 22, 2022, 13 Pages.

"Notice of Allowance Issued in U.S. Appl. No. 16/795,353", dated Dec. 22, 2022, 9 Pages.

\* cited by examiner

|         | Label 1 | Label 2 | Label 3 |
|---------|---------|---------|---------|
|         | ╲ 302   | ╲ 304   | ╲ 306   |
| Label 1 | Number of correct predictions of label 1 ╲ 308 | Number of mistakes predicting label 1 instead of label 2 ╲ 314 | Number of mistakes predicting label 1 instead of label 3 ╲ 320 |
| Label 2 | Number of mistakes predicting label 2 instead of label 1 ╲ 310 | Number of correct predictions of label 2 ╲ 316 | Number of mistakes predicting label 2 instead of label 3 ╲ 322 |
| Label 3 | Number of mistakes predicting label 3 instead of label 1 ╲ 312 | Number of mistakes predicting label 3 instead of label 2 ╲ 318 | Number of correct predictions of label 3 ╲ 324 |

|         | Label 1 | Label 2 | Label 3 |
|---------|---------|---------|---------|
|         | ╲ 302   | ╲ 304   | ╲ 306   |
| Label 1 | 5 ╲ 308 | 2 ╲ 314 | 8 ╲ 320 |
| Label 2 | 1 ╲ 310 | 9 ╲ 316 | 2 ╲ 322 |
| Label 3 | 9 ╲ 312 | 1 ╲ 318 | 2 ╲ 324 |

SYSTEM AND METHOD FOR IMPROVING MACHINE LEARNING MODELS BASED ON CONFUSION ERROR EVALUATION

BACKGROUND

Advances in computing have led to the recent usage in machine learning to automate many tasks. Machine learning (ML) has proven itself in multiple consumer applications such as web ranking and recommendation systems. In the context of enterprise scenarios, ML is emerging as a compelling tool in a broad range of applications such as marketing/sales optimization, process automation, preventative healthcare, predictive maintenance, cybersecurity, fraud detection, among other things.

Many software applications (e.g., e-mail applications, information technology (IT) ticketing applications, customer relationship management (CRM) applications) use unique taxonomies (or labels) for categorizing data based on their own respective unique processes. Over time, new taxonomies are introduced, typically by new users or via new regulations, that are intended to override old taxonomies. Problematic taxonomies (e.g., taxonomies with typographical errors, taxonomies that are conflicting with other taxonomies, etc.) may also be added. However, new taxonomies, old taxonomies, and problematic taxonomies tend to coexist, as users often fail to fully purge old and problematic taxonomies. This results in an excess of taxonomies, which can hinder the performance of such applications when attempting to locate categorized data.

Machine learning-based classification algorithms are often used to predict a class based on given data points. However, conventional machine learning algorithms are only as good as the given points that are provided thereto. If the data points comprise faulty or problematic data, the resulting classifications are flawed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for improving machine learning model-based techniques for automatically labeling data items based on identifying and resolving labels that are problematic. For instance, as will be described herein, a machine learning model may be trained to predict labels for any given data item. The machine learning model may be validated to determine a confusion metric with respect to each distinct pair of labels predicted by the machine learning model. Each confusion metric may indicate whether a particular label is being mistaken for another particular label, indicate a degree to which a particular label is being mistaken for another particular label, a frequency with which a particular label is being mistaken for another particular label, etc. The confusion metrics are analyzed to determine whether any of the machine learning model-generated labels are problematic (e.g., a label conflicts with another label, a label that is rarely predicted, a label that is incorrectly predicted, etc.). Steps for resolving the problematic labels are implemented, and the machine learning model is retrained based on the resolution steps. By doing so, the machine learning model generates a more accurate label for a data item.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a block diagram of a confusion matrix in accordance with an embodiment.

FIG. 4 shows a block diagram of a confusion matrix in which each of its row elements are populated with exemplary values in accordance with an embodiment.

Figure 1:
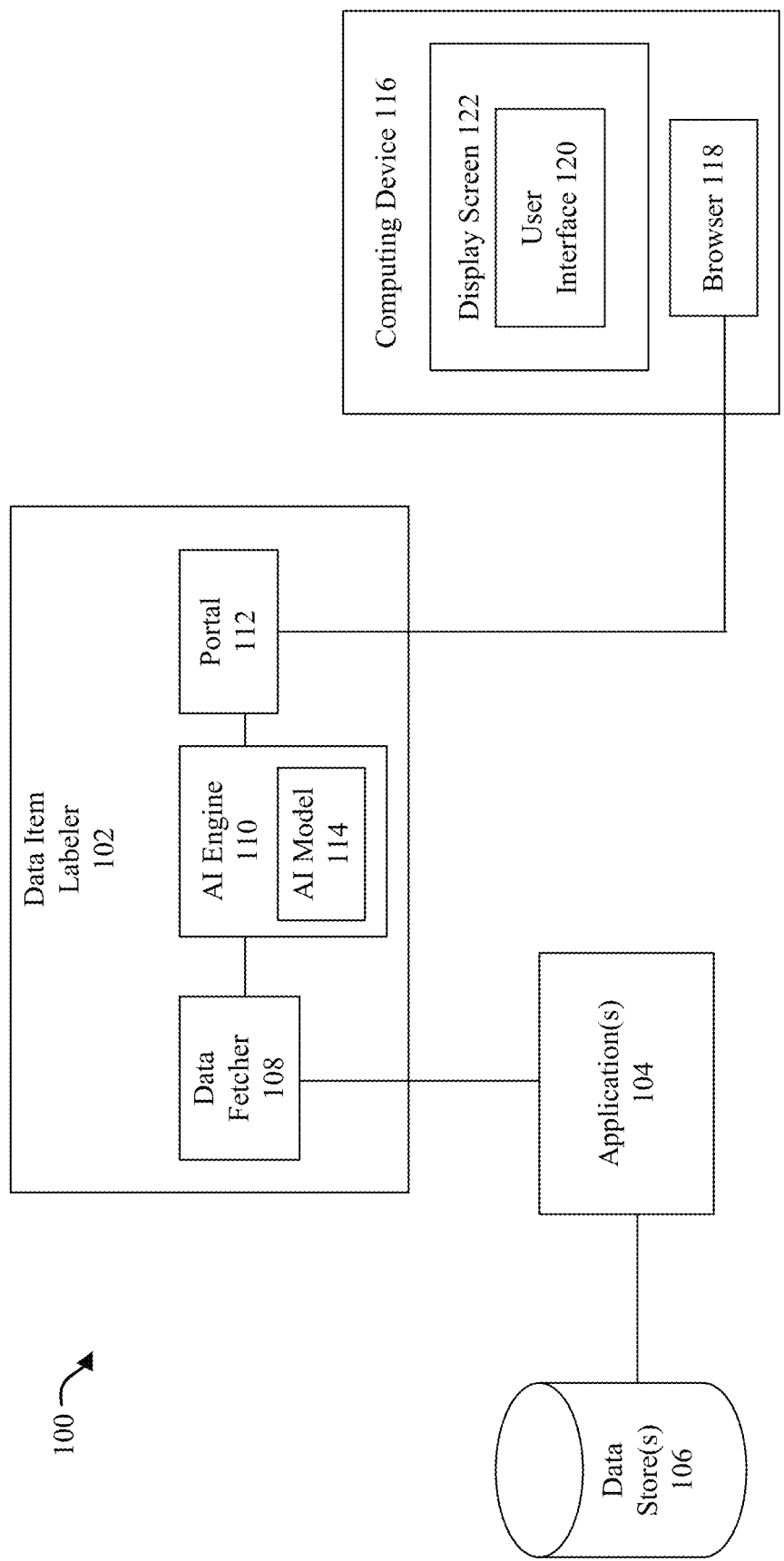
FIG. 1 shows a block diagram of a system for categorizing data items in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to improving machine learning model-based techniques for automatically labeling data items based on identifying and resolving labels that are problematic. For instance, as will be described herein, a machine learning model may be trained to predict labels for any given data item. The machine learning model may be validated to determine a confusion metric with respect to each distinct pair of labels predicted by the machine learning model. Each confusion metric may indicate whether a particular label is being mistaken for another particular label, indicate a degree to which a particular label is being mistaken for another particular label, a frequency with which a particular label is being mistaken for another particular label, etc. The confusion metrics are analyzed to determine whether any of the machine learning model-generated labels are problematic (e.g., a label conflicts with another label, a label that is rarely predicted, a label that is incorrectly predicted, etc.). Steps for resolving the problematic labels are implemented, and the machine learning model is retrained based on the resolution steps. By doing so, the machine learning model generates a more accurate label for a data item.

The embodiments described herein may advantageously improve the performance of classifier-based machine learning models. In particular, the labels (or classifications) generated by such models are more accurate, as they are not negatively impacted by problematic labels. Improving the accuracy of a classifier-based machine learning models advantageously improves the functioning of computing devices on which such models are being executed. In particular, the elimination of problematic labels advantageously reduces the processing cycles of the computing devices, as the machine learning model is not unnecessarily wasting valuable processing cycles analyzing data with respect to such labels. Moreover, the storage requirement of such computing devices is also reduced, as such labels are no longer required to be maintained by the computing devices.

Additionally, the applications in which such models are implemented also perform more efficiently. For example, if a user attempts to locate data based on labels generated by such a model, the processing burden placed on the application is reduced, as the application has a smaller amount of labels that it needs to search.

Moreover, any technological field in which such models are utilized are also improved. For instance, consider a scenario in which a classifier-based machine learning model is used in an industrial process, such as predictive maintenance. The possibility of being able to predict disruptions to the production line in advance of that disruption taking place is invaluable to the manufacturer. It allows the manager to schedule the downtime at the most advantageous time and eliminate unscheduled downtime. Unscheduled downtime hits the profit margin hard and also can result in the loss of the customer base. It also disrupts the supply chain, causing the carrying of excess stock. A poorly-functioning classifier-based machine learning model would improperly predict disruptions, and therefore, would inadvertently cause undesired downtimes that disrupt the supply chain.

Consider another scenario in which a classifier-based machine learning model is used for cybersecurity. The model would predict whether code executing on a computing system is malicious and automatically cause remedial action to occur. A poorly-functioning classifier-based machine learning model may mistakenly misclassify malicious code, thereby causing the code to comprise the system.

Consider yet another scenario in which a classifier-based machine learning model is used for autonomous (i.e., self-driving vehicles). Autonomous vehicles can get into many different situations on the road. If drivers are going to entrust their lives to self-driving cars, they need to be sure that these cars will be ready for any situation. What's more, a vehicle should react to these situations better than a human driver would. A vehicle cannot be limited to handling a few basic scenarios. A vehicle has to learn and adapt to the ever-changing behavior of other vehicles around it. Machine learning algorithms make autonomous vehicles capable of making decisions in real time. This increases safety and trust in autonomous cars. A poorly-functioning classifier-based machine learning model may misclassify a particular situation in which the vehicle is in, thereby jeopardizing the safety of passengers of the vehicle.

Consider a further scenario in which a classifier-based machine learning model is used in biotechnology for predicting a patient's vitals or whether a patient has a disease. A poorly-functioning classifier-based machine learning model may misclassify the vitals and/or the disease. In such a case, the patient may not receive necessary treatment.

These examples are just a small sampling of technologies that would be improved with more accurate classifier-based machine learning models.

FIG. 1 shows a block diagram of a system 100 for categorizing data items in accordance with an embodiment. As shown in FIG. 1, system 100 includes a data item labeler 102, one or more application(s) 104, one or more data store(s) 106, and a computing device 116. Data item labeler 102 may comprise a data fetcher 108, an artificial intelligence (AI) engine 110, and a portal 112. Each of application(s) 104 may be coupled to a respective data store of data stores(s) 106. Each of data store(s) 106 may comprise one or more databases or other storage devices. Examples of application(s) 104 include but are not limited to an e-mail application (e.g., Microsoft Outlook™), a customer relationship management (CRM) application (e.g., Microsoft Dynamics 365™), an information technology (IT)

ticketing application, etc. Data store(s) 106 may be configured to store data items associated with application(s) 104 (e.g., e-mails, IT ticketing messages, sales information, banking data, marketing data, social media data, etc.).

Data item labeler 102 is configured to automatically label data items for a particular user. The data items may be labeled based on analyzing previously-received data items having user-generated labels. For instance, data fetcher 108 may be configured to retrieve data items from data store(s) 106 via application(s) 104. In an embodiment, data fetcher 108 provides a request to application(s) 104 for the data items. In another embodiment, data fetcher 108 retrieves the data items directly from data store(s) 106. The retrieved data items are provided to AI engine 110.

AI engine 110 may be configured to extract various pieces of information (or features) from each of the data items. The information is analyzed to determine patterns and aggregated aspects that are similar between a plurality of different data items. For examples, common textual patterns (i.e., templates) and key phrases from various fields of the data items are determined. Examples of fields from which features are extracted include but are not limited to, a sender address field, a timestamp field, textual fields (e.g., a subject field, a body field, a description field, etc.), platform (or application)-specific fields, etc. Examples of features that are extracted from a sender address field include, but are not limited to, the most frequent senders, each sender's frequency, affiliations of a sender (e.g., @microsoft.com, @gmail.com, etc.), etc. An example of a feature that is extracted from a time stamp field includes, but is not limited to, the arrival time of messages. Examples of features that are extracted from textual fields include, but are not limited, repeating textual patterns (e.g., templates), key phrases that appear frequently in the textual fields, frequencies of words and/or characters in the textual fields, etc. Examples of features that are extracted from platform specific fields include, but are not limited to, the percentage of replied messages, an average people on a message thread, etc.

After the information from the retrieved data items is extracted, AI engine 110 may train an AI model 114 that is configured to automatically label any given data item (e.g., newly-received data items) based on the extracted information. AI model 114 may be trained based on a subset of data items having predetermined labels (or labels or categories). The labels may be designated by a user via portal 112. A user may access portal 112 via computing device 116. A user may access portal 112 by interacting with an application at computing device 116 capable of accessing portal 112. For example, the user may use browser 118 to traverse a network address (e.g., a uniform resource locator) to portal 112, which invokes a user interface 120 (e.g., a web page) in a browser window rendered on a display screen 122 coupled to computing device 116. By interacting with user interface 120, the user may utilize portal 120 to designate labels for data items to be received and cause AI engine 110 to train AI model 114, among other things. Computing device 116 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Using portal 112, a user may be provided a list of all the user-generated labels associated with the different data items retrieved by data fetcher 108. The user may select which labels in the list are to be utilized for training AI model 114. Upon selecting the labels, the user may cause AI engine 110 to train AI model 114, e.g., by interacting with a user-interactive element (e.g., a "Train" button) provided via portal 112. Upon interacting with the user-interactive element, data fetcher 108 may be configured to retrieve the data items from data stores(s) 106 that are associated with the selected labels. A first portion of the data items and their associated user-generated labels may be utilized to train AI model 114. A second portion of the data items may be utilized to validate AI model 114. In accordance with an embodiment, AI model 114 may be trained in accordance with a supervised machine learning algorithm that learns which label to apply to a particular data item based on the extracted features of data items (as described above), the first portion of data items and their associated-user generated labels.

When a new data item is received via application(s) 104 after AI model 114 is trained, it is fetched by data fetcher 108 and the features of the new data item are transformed into numerical vectors that quantify the contributions of each feature by AI engine 108. The vectorized data item is provided as an input to the AI model, and the AI model predicts the category or label for the new data item. The AI model may also provide a confidence level in its prediction of the category. The confidence level may be a value between 0.0 and 1.0, where a relatively lower value is associated with a lower confidence level and a relatively higher value is associated with a higher confidence value. The predicted category and/or confidence level are provided to data fetcher 108. Data fetcher 108 may determine whether the confidence level is above a predetermined threshold. If the confidence level is above or equal the predetermined threshold, data fetcher 108 provides the predicted label to application(s) 104, and application(s) 104 apply the label to the data item accordingly. If the confidence level is below the predetermined threshold, data fetcher 108 does not provide the predicted label to application(s) 104, and the data item is not labeled.

Over time, the labels might change (for instance when a new manager arrives and decides to add or remove labels). In addition, some labels might have the same meaning but different name (for example 'purchase order' and 'Purchase order') when set by different labelers due to typos and miscommunications. These issues are very common and can influence AI model 114 in such way that will produce prediction errors.

Even when no typos are present, some categories might share similar definitions. For example, a message regarding "Installing an anti-virus software on new PC" might be categorized as both "Software support" (installing an anti-virus software) and "Purchase order". This requires expert knowledge in the label selection process and can be done manually.

Figure 2:
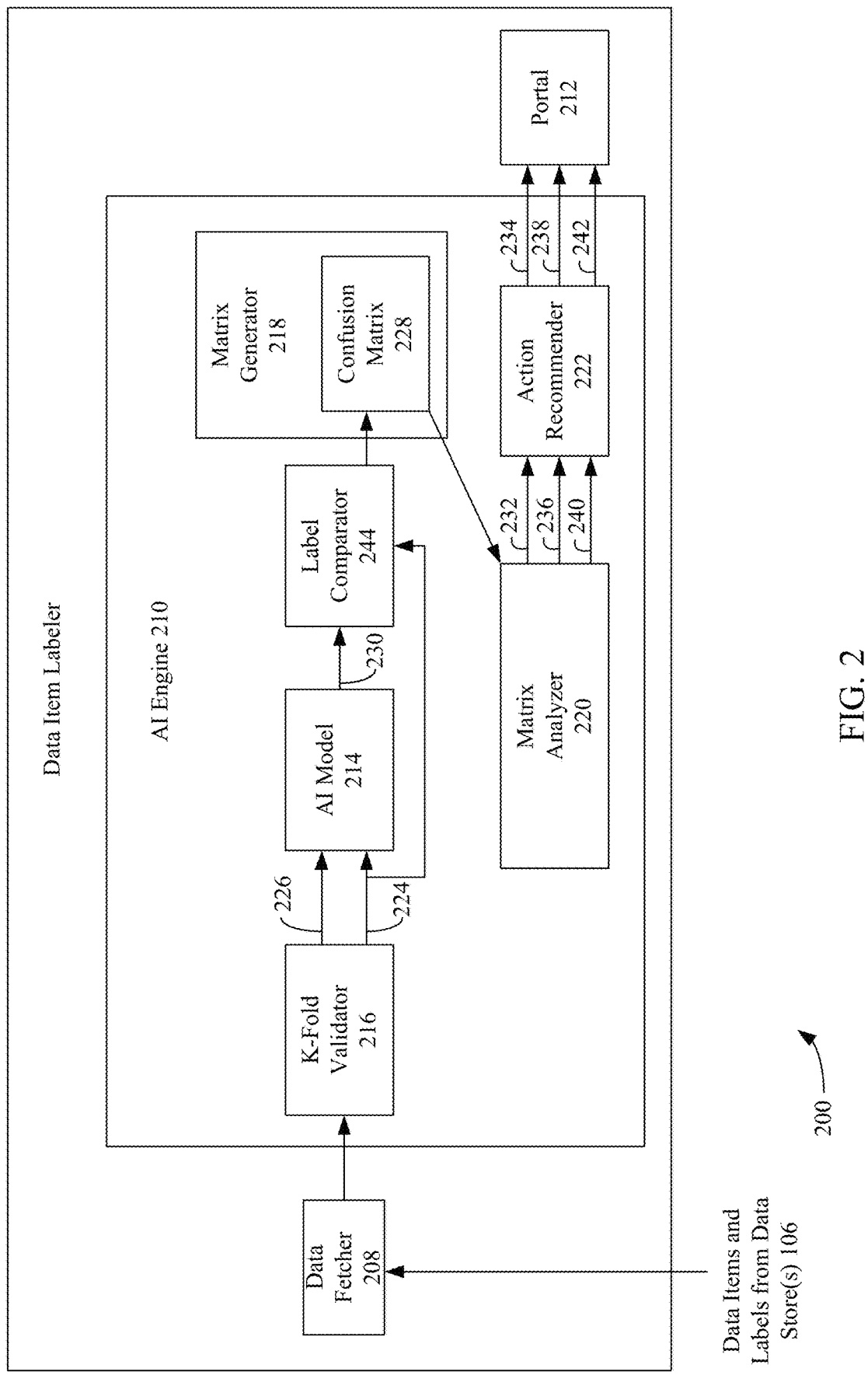
FIG. 2 shows a block diagram of a data item labeler configured to identify problematic labels in accordance with an embodiment.

Embodiments described herein may be configured to identify problematic labels, resolve the problematic labels, and retrain the AI model based on the resolutions of the problematic labels. For instance, FIG. 2 shows a block diagram of a data item labeler 200 configured to identify problematic categories in accordance with an embodiment. Data item labeler 200 is an example of data item labeler 102, as described above with reference to FIG. 1. As shown in FIG. 2, data item labeler 200 comprises a data fetcher 208, an AI engine 210, and a portal 212. Data fetcher 208, AI engine 210, and portal 212 are examples of data fetcher 108, AI engine 110, and portal 112, as described above with reference to FIG. 1. As also shown in FIG. 2, AI engine 210 comprises an AI model 214, a k-fold validator 216, a matrix generator 218, a matrix analyzer 220, an action recommender 222, and a label comparator 244. AI model 214 is an example of AI model 114, as described above with reference to FIG. 1.

When training AI model 214, a user may select labels of data items that are to be retrieved from data store(s) (e.g., data store(s) 106, as shown in FIG. 1). The data items having the selected labels are retrieved by data fetcher 208 and provided to AI engine 210. K-fold validator 216 may be configured to separate the data items into a k number of datasets, where k is any positive integer. In accordance with an embodiment, the value of k is 10. K-fold validator 216 may designate one of the datasets as a validation set 224 for validating AI model 214. K-fold validator 216 may designate the remaining k−1 datasets as a training set 226 for training AI model 214.

AI engine 210 trains AI model 214 using training set 226 and provides as input to AI model 214 validation set 224. To validate AI model 214, AI model 214 generates a label 230 for each data item in validation set 224. Label comparator 244 compares the machine learning model-generated label 230 associated with each data item in validation set 224 to the user-generated label associated with same data item in validation set 224 to determine mispredictions between two different labels. The mispredictions between each distinct pair of labels of machine learning model-generated labels 230 are summed and saved. Such mispredictions may be referred to as confusion metrics. The number of correct predictions for a particular machine learning model-generated label are also summed and saved. This validation process is repeated a total of k times, where, each time, validation set 224 comprises a different dataset of the k sets and the training set 226 comprises the remaining k−1 datasets. The mispredictions between each distinct pair of labels of machine learning model-generated labels 230 are accumulated over the k iterations. The number of correct predictions for a particular machine learning model-generated label are also accumulated over the k iterations.

It is noted that while the confusion metrics described herein may indicate whether a particular label is being mistaken for another particular label, the confusion metrics may also indicate a degree to which a particular label is being mistaken for another particular label, a frequency with which a particular label is being mistaken for another particular label, etc.

Matrix generator 218 may be configured to generate a confusion matrix 228 based on the accumulated mispredictions (i.e., confusion metrics) and correct predictions. For example, FIG. 3 shows a block diagram of a confusion matrix 300 in accordance with an embodiment. Confusion matrix 300 is an example of confusion matrix 228, as shown in FIG. 2. As shown in FIG. 3, confusion matrix 300 comprises a plurality of columns 302, 304, and 306 that are each associated with a particular label. Each of columns 302, 304, and 306 include a plurality of row elements. For example, column 302 comprises row element 308, row element 310, and row element 312. Column 304 comprises row element 314, row element 316, and row element 318. Column 306 comprises row element 320, row element 322, and row element 324. It is noted that while confusion matrix 300 is generated for three labels, a confusion matrix may be generated for any number of labels.

Row element 308 comprises the number of correct predictions of label 1 over the k iterations. Row element 310 comprises the number of mistakes predicting label 2 instead of label 1 over the k iterations. Row element 312 comprises the number of mistakes predicting label 3 instead of label 1 over the k iterations. Row element 314 comprises the number of mistakes predicting label 1 instead of label 2 over the k iterations. Row element 316 comprises the number of correct predictions of label 2 over the k iterations. Row element 318 comprises the number of mistakes predicting label 3 instead of label 2 over the k iterations. Row element 320 comprises the number of mistakes predicting label 1 instead of label 3 over the k iterations. Row element 322 comprises the number of mistakes predicting label 2 instead of label 3 over the k iterations. Row element 324 comprises the number of correct prediction so label 3.

Referring again to FIG. 2, matrix analyzer 220 may be configured to analyze confusion matrix 228 (or confusion matrix 300, as shown in FIG. 3) to determine a confusion metric (that is indicative of mispredictions) for each distinct pair of labels and identify one or more of the plurality of machine learning model-generated labels that are problematic. Based on the analysis, matrix analyzer 220 may determine whether two labels are problematic (e.g., two labels similar (or have a conflict), whether a label is weak, or whether a label disturbs another label).

To determine whether label is similar, matrix analyzer 220 may analyze confusion matrix 228/300 to determine whether the values of row elements comprising values of the number of mistakes between two labels is above a predetermined threshold.

For example, FIG. 4 shows a block diagram of a confusion matrix 400 in which each of its row elements are populated with exemplary values in accordance with an embodiment. As shown in FIG. 4, row elements 312 and 320 each comprise a high number of mispredictions between labels 1 and 3 (i.e., both values are above a predetermined threshold). Based on these values, matrix analyzer 220 may determine that labels 1 and 3 are in conflict with (or similar to) each other. Examples of such labels include, but are not limited, labels that are spelled the same but have mismatched cases (e.g., "Purchase Orders" vs. "purchase orders"), labels that have typographical errors (e.g., "software support" vs. "software support"), etc. Upon determining that two labels are similar or confusing, matrix analyzer 220 may provide a notification 232 to action recommender 222 that indicates that two labels that are similar or confusing (e.g., labels 1 and 3).

Action recommender 222 causes a recommendation 234 for resolving the similar or confusing labels to be displayed to a user via portal 212 based on notification 232. For instance, recommendation 234 may be displayed via a web page rendered by browser 118, as described above with reference to FIG. 1. Recommendation 234 may indicate that the two confusing or similar labels should be merged. For instance, recommendation 234 may specify that one of the two labels should be removed or deleted.

The user may remove the label(s) from consideration via portal 212. After removing the label(s), the user may cause AI model 214 to be retrained without the removed label(s) (e.g., by interacting with a user-interactive element that initiates the retraining of AI model 214).

Weak labels may be labels that are rarely predicted or inferred and other labels were frequently inferred instead. This means that the label is easily interrupted and miscategorized. To determine whether labels are weak, matrix analyzer 220 may analyze a sum of mispredictions across a particular label's column (each row element in that label's column) and determine whether the sum is greater than or equal to a predetermined threshold. In accordance with an embodiment, matrix analyzer 220 may determine whether a label is weak in accordance with Equations 1 and 2, which are shown below:

$$\text{off diagonal} = \sum_{i=1}^{\#labels}\sum_{j=1}^{\#labels} CM_{i,j} - \sum_{i=1}^{\#labels} CM_{i,i} \quad \text{(Equation 1)}$$

$$\text{Weakness of label } j = \frac{\left(\sum_{i=1}^{\#labels} CM_{j,i}\right) - CM_{j,j}}{\text{off diagonal}} \quad \text{(Equation 2)}$$

where CM represents the generated confusion matrix (e.g., confusion matrix 228/230), and i represents a column number of the confusion matrix, and j represents a row number of the confusion matrix.

Equation 1 is used to calculate the sum of mispredictions stored in each row element that are off diagonal (i.e., the sum of row elements 314, 320, 310, 322, 312, and 318). Equation 2 calculates the weakness of a particular label j based on the sum of each of the elements of that label's column divided by the value calculated via Equation 1. For example, to determine the weakness of Label 1, the values of row elements 308, 310, and 312 are summed (minus the diagonal element of that label) and divided by the off diagonal value calculated via Equation 1. To determine the weakness of Label 2, the values of row elements 314, 316, and 318 are summed (minus the diagonal element of that label) and divided by the off diagonal value calculated via Equation 1. To determine the weakness of Label 3, the values of row elements 320, 322, and 324 are summed (minus the diagonal element of that label) and divided by the off diagonal value calculated via Equation 1. If the weakness of a particular label is greater than or equal to a predetermined threshold, matrix analyzer 220 may determine that the label is weak. If the weakness of a particular label is less than the predetermined threshold, matrix analyzer 220 may determine that the label is not weak.

Upon determining that a label is weak, matrix analyzer 220 may provide a notification 236 to action recommender 222 that specifies the label determined to be weak.

Action recommender 222 causes a recommendation 238 for resolving the weak labels to be displayed to a user via portal 212 based on notification 236. For instance, recommendation 238 may be displayed via a web page rendered by browser 118, as described above with reference to FIG. 1. Recommendation 238 may indicate that the weak label should be removed or deleted.

The user may remove the label(s) from consideration via portal 212. After removing the label(s), the user may cause AI model 214 to be retrained without the removed label(s) (e.g., by interacting with a user-interactive element that initiates the retraining of AI model 214).

Disturbing labels may be categories that are frequently predicted or inferred incorrectly instead of other correct categories. To determine whether labels are disturbing, matrix analyzer 220 may analyze a sum of mispredictions across a particular label's row and determine whether the sum is greater than or equal to a predetermined threshold. In accordance with an embodiment, matrix analyzer 220 may determine whether a label is weak in accordance with Equation 3, which is shown below:

$$\text{Distrubance of label } j = \frac{\left(\sum_{i=1}^{\#labels} CM_{i,j}\right) - CM_{j,j}}{\text{off diagonal}} \quad \text{(Equation 3)}$$

Equation 3 calculates the disturbance of a particular label j based on the sum of that label's row elements divided by the value calculated via Equation 1. For example, to determine the disturbance of Label 1, the values of row elements 308, 314, and 320 are summed (minus the diagonal element of that label) and divided by the off diagonal value calculated via Equation 1. To determine the disturbance of Label 2, the values of row elements 310, 316, and 322 are summed (minus the diagonal element of that label) and divided by the off diagonal value calculated via Equation 1. To determine the disturbance of Label 3, the values of row elements 312, 318, and 324 are summed (minus the diagonal element of that label) and divided by the off diagonal value calculated via Equation 1. If the disturbance of a particular label is greater than or equal to a predetermined threshold, matrix analyzer 220 may determine that the label disturbs another label. If the disturbance of a particular label is less than the predetermined threshold, matrix analyzer 220 may determine that the label does not disturb another label.

Upon determining that a label is disturbing, matrix analyzer 220 may provide a notification 240 to action recommender 222 that specifies the label determined to be disturbing.

Action recommender 222 causes a recommendation 242 for resolving the disturbing label to be displayed to a user via portal 212 based on notification 240. For instance, recommendation 242 may be displayed via a web page rendered by browser 118, as described above with reference to FIG. 1. Recommendation 242 may specify that the user is to add additional data items to enrich the data with samples of this disturbing label. For instance, recommendation 242 may instruct the user to manually classify more data items that belong to this category.

For example, suppose a case labeled "Employee transfer" involves moving an employee and his or her equipment ("Hardware issue") to a new work environment, installing new software relevant to his or her new job (which can be associated with another label "Software issue") and possibly supplying him with new equipment (which can be associated with yet another label "Purchase order"). To determine the difference between "Employee transfer", "Software issue," and "Purchase order," and ensure there are no conflicts of predicting "Employee transfer" many times over "Software issue," and "Purchase order," the user may be recommended to add more of these items so the AI model 214 can learn how to differentiate between the cases better.

After the user provides additional data items, the user may cause AI model 214 to be retrained using the additional data items (e.g., by interacting with a user-interactive element that initiates the retraining of AI model 214).

Figure 5:
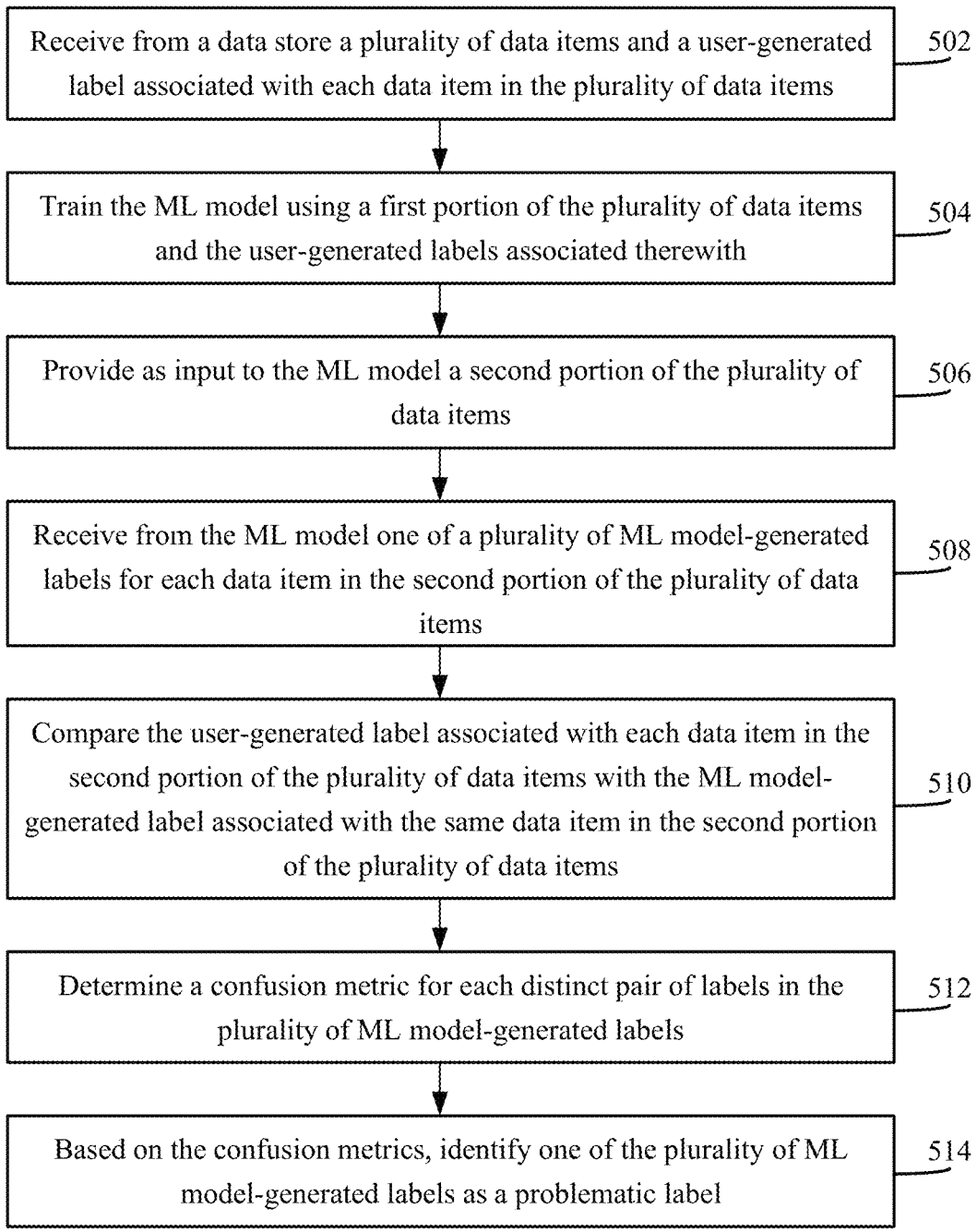
FIG. 5 shows a flowchart of a method for identifying problematic labels in accordance with an example embodiment.

Accordingly, problematic machine learning model-generated labels may be identified in many ways. For example, FIG. 5 shows a flowchart 500 of a method for identifying problematic labels, according to an example embodiment. In an embodiment, flowchart 500 may be implemented by data item labeler 200, as shown in FIG. 2. Accordingly, flowchart 500 will be described with continued reference to FIG. 2. Other structural and operational embodiments will be apparent to persons skilled in the relevant art(s) based on the following discussion regarding flowchart 500 and data item labeler 200 of FIG. 2.

Flowchart 500 of FIG. 5 begins with step 502. In step 502, a plurality of data items and a user-generated label associated with each data item in the plurality of data items is received from a data store. For example, with reference to FIG. 2, data fetcher 208 retrieves data items and their associated user-generated labels from a data store (e.g., data store(s) 106, as described above with reference to FIG. 1). A user may designate the labels of data items that are to be retrieved via portal 212.

In accordance with one or more embodiments, the plurality of data items comprises at least one of e-mails, customer relationship management application-related messages, or support ticketing system-related messages.

After receiving the plurality of data items, a machine learning model is validated via steps 504, 506, 508, and 510, as will be described below. Steps 504, 506, 508, and 510 may be performed a k number of times, where k is any positive integer.

In step 504, the machine learning model is trained using a first portion of the plurality of data items and the user-generated labels associated therewith. For example, with reference to FIG. 2, AI model 214 is trained using a first portion of the plurality of data items (e.g., training set 226).

In step 506, a second portion of the plurality of data items is provided as input to the machine learning model. For example, with reference to FIG. 2, a second portion of the plurality of data items (e.g., validation set 224) is provided as input to AI model 214.

In step 508, one of a plurality of machine learning model-generated labels for each data item in the second portion of the plurality of data items is received from the machine learning model. For example, with reference to FIG. 2, label comparator 244 receives from AI model 214 one of a plurality of ML model-generated labels 230 for each data item in validation set 224.

In step 510, the user-generated label associated with each data item in the second portion of the plurality of data items is compared with the ML model-generated label associated with the same data item in the second portion of the plurality of items. For example, with reference to FIG. 2, label comparator 244 compares the user-generated label associated with each data item in validation set 224 to ML model-generated label 230 associated with the same data item in validation set 224.

In step 512, based on the validating of the machine learning model, a confusion metric for each distinct pair of labels in the plurality of machine learning model-generated labels is determined. For example, label comparator 244 determines a confusion metric for each distinct pair of labels in the plurality of machine learning model-generated labels and provides the confusion metrics to matrix generator 218, which stores the confusion metrics in confusion matrix 228.

In step 514, based on the confusion metrics, one of the plurality of machine learning model-generated labels is identified as a problematic label. For example, with reference to FIG. 2, matrix analyzer 222 identifies one of the plurality of machine learning model-generated labels 230 as a problematic label based on analyzing the confusion metrics of confusion matrix 228.

In accordance with one or more embodiments, the one of the plurality of machine learning model-generated labels is identified as being in conflict with another label of the plurality of ML model-generated labels.

In accordance with one or more embodiments, responsive to identifying the one of the plurality of ML model-generated labels as problematic, the problematic label is merged with the other label that is in conflict with the problematic model and the machine learning model is retrained after the merge. For example, with reference to FIG. 2, action recommender 222 may provide a recommendation 234 based on notification 232 that recommends that the identified problematic label should be merged. The user may merge the problematic label with the label that it conflicts with and cause AI engine 210 to retrain AI model 214 accordingly via portal 212.

In accordance with one or more embodiments, the one of the plurality of machine learning model-generated labels is identified as a relatively weak label such that other labels of the plurality of machine learning model-generated labels are predicted by the machine learning model instead of the one of the plurality of machine learning model-generated labels.

In accordance with one or more embodiments, responsive to identifying the one of the plurality of ML model-generated labels as problematic, the problematic label is removed and the machine learning model is retrained after the removal. For example, with reference to FIG. 2, action recommender 222 may provide a recommendation 238 based on notification 236 that recommends that the identified problematic label should be removed. The user may remove the problematic label and cause AI engine 210 to retrain AI model 214 without the problematic label via portal 212.

In accordance with one or more embodiments, the one of the plurality of machine learning model-generated labels is identified as disturbing other labels of the plurality of machine learning model-generated labels such that the one of the plurality of machine learning model-generated labels is incorrectly predicted by the machine learning model instead of the other labels.

In accordance with one or more embodiments, responsive to identifying the one of the plurality of ML model-generated labels as problematic, additional data items associated with the problematic label are provided to the machine learning model and the machine learning model is retrained accordingly. For example, with reference to FIG. 2, action recommender 222 may provide a recommendation 242 based on notification 240 that recommends that additional data items should be provided to AI model 214. The user may provide the additional data items to AI model 214 and cause AI engine 210 to retrain AI model 214 with the additional data items via portal 212.

III. Additional Example Embodiments

A. General Labels

Referring again to FIG. 2, AI engine 210 may also be configured to identify general labels, such as "Other." Data items having this label tend to have an unpredictable nature and may be difficult to predict. AI engine 210 may be configured to rank different labels and eliminate labels having a relatively lower score. The foregoing may be achieved using a "cluster score" technique.

Figure 6:
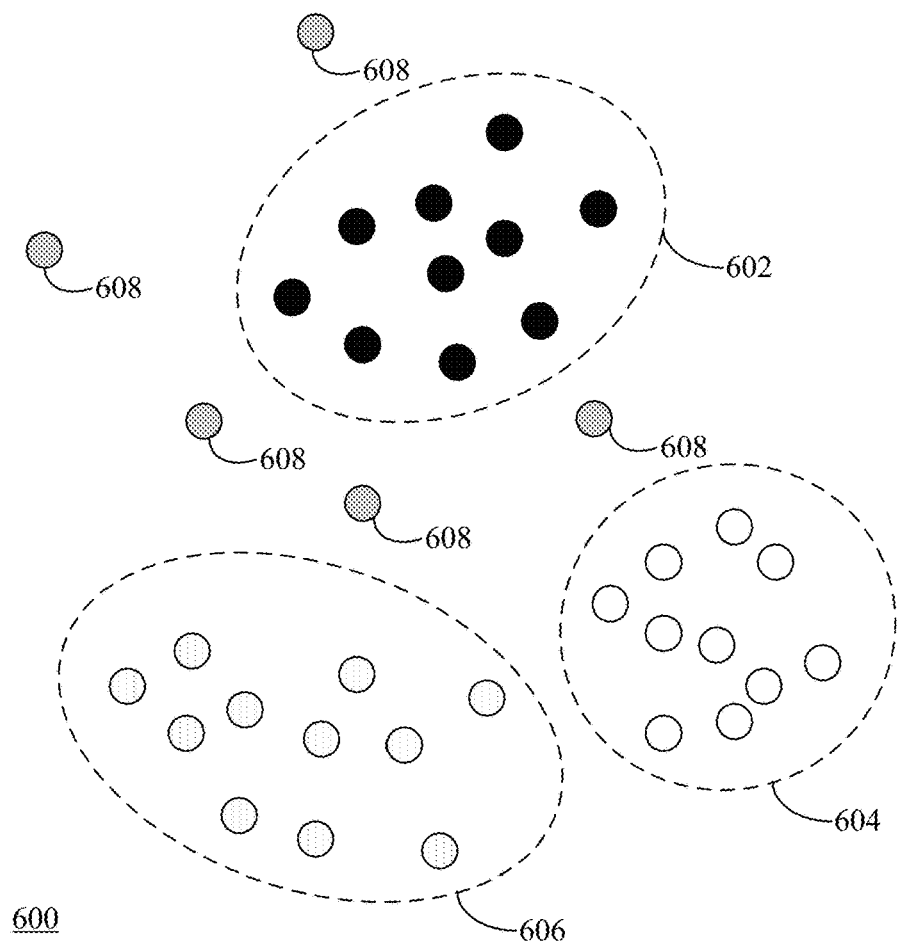
FIG. 6 shows a diagram illustrating different clusters of data items in accordance with an example embodiment.

For instance, as described above, data items are vectorized into numbers. Each feature may produce several slots in the vector. This representation allows AI engine 210 to measure a numerical distance between any two data items in a high dimension hyper plane. For instance, FIG. 6 shows a diagram 600 illustrating different clusters of data items in accordance with an example embodiment. As shown in FIG. 6, there are three clusters 602, 604, and 606, where cluster 602 represents a first label, cluster 604 represents a second label, and cluster 606 represents a third label. Points 610 represent general labels generated by AI model 214. When attempting to train AI model 214 using such general labels, such labels behave like noise and confuse AI model 214.

To overcome this issue, AI engine 210 may generate a label score for each label using the total variance of data items. AI engine 210 may be configured to calculate the mean of all data items $\bar{x}$ and calculate a cost using the sum of distances of all data items from the mean in accordance with Equation 4, which is shown below:

$$V_*[X] = \frac{1}{\#samples} \sum_{k=1}^{\#samples} \|\vec{x_k} - \bar{x}\|_*$$ (Equation 4)

Where $V_*$ represents the variance. The measure of distance from the mean may be the Euclidean distance. AI engine 210 may utilize a specific measure that prioritizes the elements of vectors $\vec{x_k}$ based on variable importance and prior knowledge. This may implemented by constructing a weighted norm $\|.\|_*$ with weights according to the importance.

AI engine 210 may generate a relatively low label score for labels having a relatively high variance and eliminate such labels and AI model 214 is retrained accordingly. In accordance with an embodiment, AI engine 210 may provide a notification to action recommender 222 which causes a notification to be displayed to the user via portal 212. The notification may enable the user to force using the label rather than eliminating it from training AI model 214. In the event the user decides the label is not to be discarded, a recommendation may be presented to the user to refine the label (e.g., split the label into one or more different categories).

Figure 7:
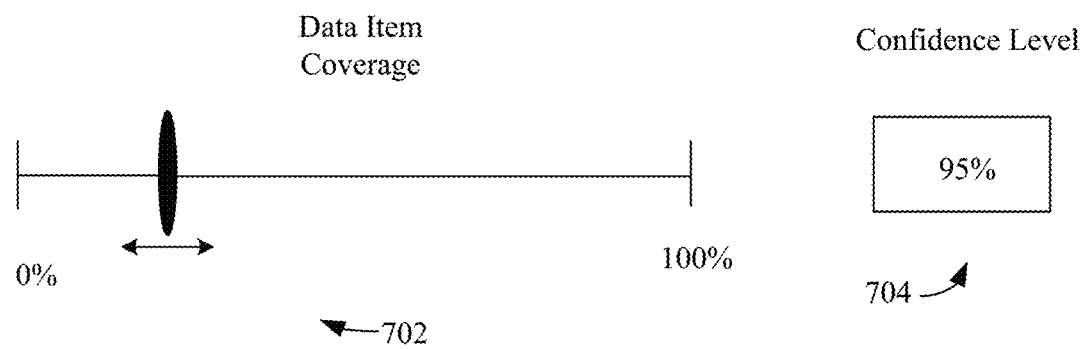
FIG. 7 shows exemplary user interface elements for enabling a user to control and set the coverage of prediction and/or the confidence level of the prediction in accordance with an example embodiment.

B. User Control of the Tradeoff Between the Threshold of the Confidence Level and the Coverage of Auto-Label Portal 212 may display to the user the tradeoff between the coverage of prediction and the confidence level of the prediction and further enable a user to control and set the coverage of prediction and/or the confidence level. For example, FIG. 7 shows exemplary user interface elements 702 and 704 for enabling a user to control and set the coverage of prediction and/or the confidence level of the prediction in accordance with an example embodiment. User interface element 702 may be a dynamic scroller that enables the user to designate the coverage of data items for prediction, and user interface element 704 may be a text box in which the user may specify a confidence level for the predictions. A relationship is maintained between user interface element 702 and user interface element 704 such that if the value of the coverage of prediction is changed, so does the confidence level of prediction, and vice versa. For instance, as the dynamic scroller of user interface element 702 slides to the left, the confidence level shown in user interface element 704 is increased, and as the dynamic scroller of user interface element 702 slides to the right, the confidence level shown in user interface element 704 is decreased. It is noted that user interface elements 702 and 704 are purely exemplary and that other user interface elements may be utilized.

To enable the dynamic scroller of user interface element 702, an array of N tuples $\{(\hat{p}_j, s_j)\}_{j=1}^N$ (where $\hat{p}_j$ corresponds to the confidence level and $s_j$ corresponds to the number of samples (or data items)) is formed so that changing the value of $s_j$ causes the display of confidence level $\hat{p}_j$.

During training of AI model 214, a number of samples or data items $\{m_i\}_{i=1}^M$ are obtained. After training AI model 214, AI model 214 predicts the labels of these M samples and keeps the confidence level (i.e., the estimated probability for a corrected prediction) of each sample and stores this array of probabilities in $\{p(m_i)\}_{i=1}^M$ from the training set (e.g., training set 226).

The confidence levels $\{p(m_i)\}_{i=1}^M$ are then sorted in a descending order and the K unique values are saved to a sequence $\{(\hat{p}_j, s_j)\}_{j=1}^K$.

If K≤N, then N is set equal to K and the list of tuples $$i\left\{\left(\hat{p}_j, CDF_j = \frac{1}{M}\sum_{l=1}^{j} = s_l\right)\right\}_{j=1}^K$$

is utilized. Otherwise, to use this sequence, a cumulative distribution function (CDF) is generated in accordance with Equation 5, which is shown below.

$$CDF_j = \frac{1}{M}\sum_{l=1}^{j} s_l \quad \forall j = 1, \ldots, K$$ (Equation 5)

From Equation 5, it is shown that the CDF function is monotonically increasing and $CDF_K=1$. $CDF_0$ is set to 0 in order to get a scale from 0 to 1 (percentage). The CDF is fit using a smooth function and it is sampled uniformly into N slots. Since this function is monotonically increasing.

IV. Example Computer System Implementation

Data item labeler 102, data fetcher 108, AI engine 110, AI model 114, portal 112, browser 118, data item labeler 200, data fetcher 208, AI engine 210, K-fold validator 216, AI model 214, label comparator 244, matrix generator 218, confusion matrix 228, matrix analyzer 220, action recommender 222, portal 212, confusion matrix 300, and confusion matrix 400 (and/or any of the components described therein), and/or flowchart 500, may be implemented in hardware, or hardware combined with one or both of software and/or firmware. For example, data item labeler 102, data fetcher 108, AI engine 110, AI model 114, portal 112, browser 118, data item labeler 200, data fetcher 208, AI engine 210, K-fold validator 216, AI model 214, label comparator 244, matrix generator 218, confusion matrix 228, matrix analyzer 220, action recommender 222, portal 212, confusion matrix 300, and confusion matrix 400 (and/or any of the components described therein), and/or flowchart 500 may be implemented as computer program code/instructions configured to be executed in one or more processors and stored in a computer readable storage medium.

Alternatively, data item labeler 102, data fetcher 108, AI engine 110, AI model 114, portal 112, browser 118, data item labeler 200, data fetcher 208, AI engine 210, K-fold validator 216, AI model 214, label comparator 244, matrix generator 218, confusion matrix 228, matrix analyzer 220, action recommender 222, portal 212, confusion matrix 300, and confusion matrix 400 (and/or any of the components described therein), and/or flowchart 500 may be implemented as hardware logic/electrical circuitry.

For instance, in an embodiment, one or more, in any combination, of data item labeler 102, data fetcher 108, AI engine 110, AI model 114, portal 112, browser 118, data item labeler 200, data fetcher 208, AI engine 210, K-fold validator 216, AI model 214, label comparator 244, matrix generator 218, confusion matrix 228, matrix analyzer 220, action recommender 222, portal 212, confusion matrix 300, and confusion matrix 400 (and/or any of the components described therein), and/or flowchart 500 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
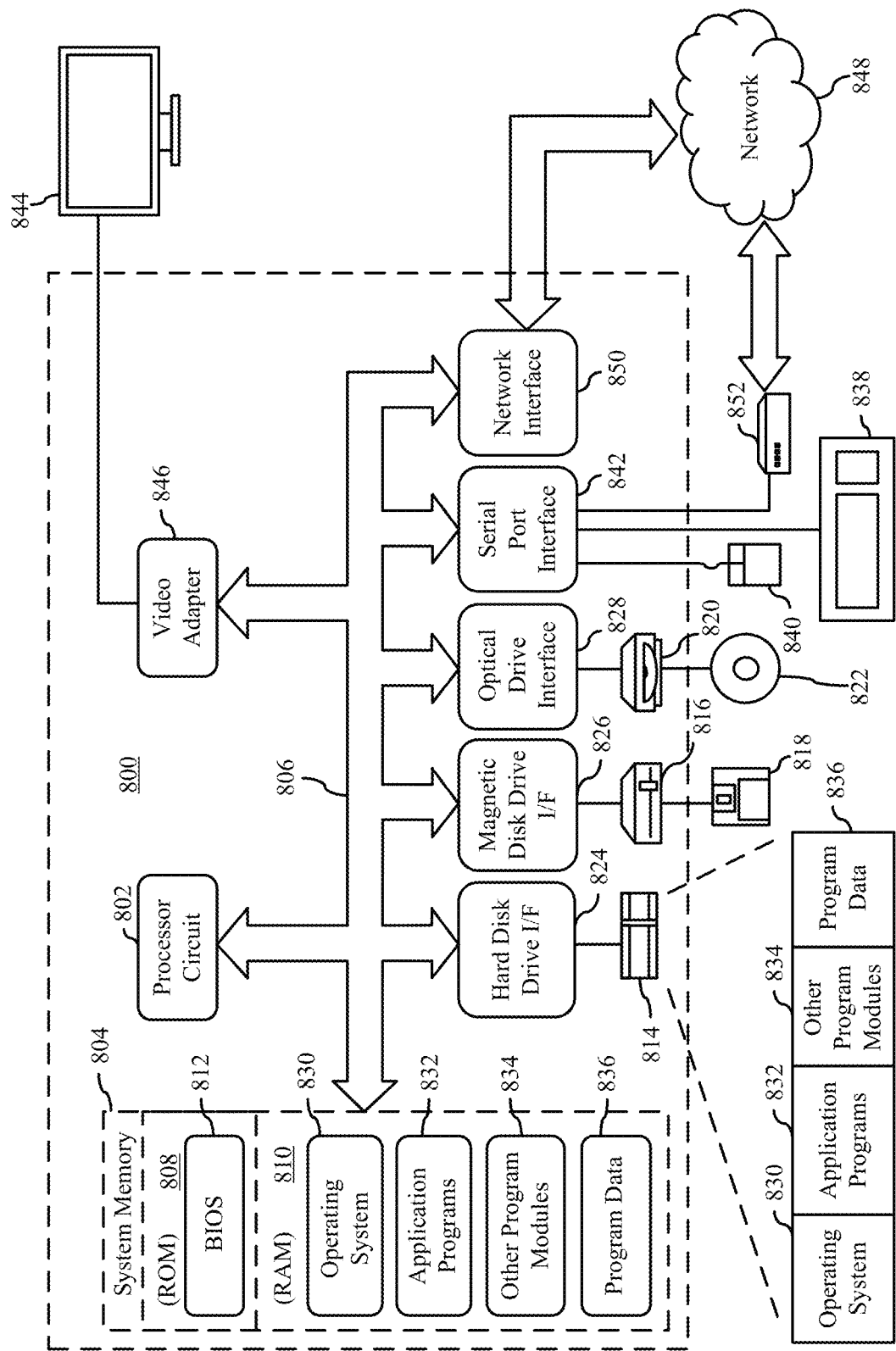
FIG. 8 is a block diagram of an example processor-based computer system that may be used to implement various embodiments.

FIG. 8 depicts an exemplary implementation of a computing device 800 in which embodiments may be implemented. For example, data item labeler 102, data fetcher 108, AI engine 110, AI model 114, portal 112, computing device 116, browser 118, data item labeler 200, data fetcher 208, AI engine 210, K-fold validator 216, AI model 214, label comparator 244, matrix generator 218, confusion matrix 228, matrix analyzer 220, action recommender 222, portal 212, confusion matrix 300, and confusion matrix 400 (and/or any of the components described therein), and/or flowchart 500 (and/or any of the components described therein) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of data item labeler 102, data fetcher 108, AI engine 110, AI model 114, portal 112, browser 118, data item labeler 200, data fetcher 208, AI engine 210, K-fold validator 216, AI model 214, label comparator 244, matrix generator 218, confusion matrix 228, matrix analyzer 220, action recommender 222, portal 212, confusion matrix 300, and confusion matrix 400 (and/or any of the components described therein), and/or flowchart 500, and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

A method is described herein. The method comprises: receiving from a data store a plurality of data items and a user-generated label associated with each data item in the plurality of data items; validating a machine learning (ML) model by: training the ML model using a first portion of the plurality of data items and the user-generated labels associated therewith; providing as input to the ML model a second portion of the plurality of data items; receiving from the ML model one of a plurality of ML model-generated labels for each data item in the second portion of the plurality of data items; and comparing the user-generated label associated with each data item in the second portion of the plurality of data items with the ML model-generated label associated with the same data item in the second portion of the plurality of data items; based on the validating of the ML model, determining a confusion metric for each distinct pair of labels in the plurality of ML model-generated labels; and based on the confusion metrics, identifying one of the plurality of ML model-generated labels as a problematic label.

In one embodiment of the foregoing method, the plurality of data items comprises at least one of: e-mails; customer relationship management application-related messages; or support ticketing system-related messages.

In one embodiment of the foregoing method, identifying the one of the plurality of ML model-generated labels as problematic comprises: identifying the one of the plurality of ML model-generated labels as being in conflict with another label of the plurality of ML model-generated labels.

In one embodiment of the foregoing method, the method further comprises: performing, responsive to the identifying the one of the plurality of ML model-generated labels as problematic: merging the problematic label with the other label that is conflict with the problematic label; and retraining the ML model after said merging.

In one embodiment of the foregoing method, the identifying the one of the plurality of ML model-generated labels as problematic comprises: identifying the one of the plurality of ML model-generated labels as a relatively weak label such that other labels of the plurality of ML model-generated labels are predicted by the ML model instead of the one of the plurality of ML model-generated labels.

In one embodiment of the foregoing method, the method further comprises: performing, responsive to the identifying the one of the plurality of ML model-generated labels as problematic: removing the problematic label; and retraining the ML model after said removing.

In one embodiment of the foregoing method, identifying the one of the plurality of ML model-generated labels as problematic comprises: identifying the one of the plurality of ML model-generated labels as disturbing other labels of the plurality of ML model-generated labels such that the one of the plurality of ML model-generated labels is incorrectly predicted by the ML model instead of the other labels.

In one embodiment of the foregoing method, the method further comprises: performing, responsive to the identifying the one of the plurality of ML model-generated labels as problematic: providing additional data items associated with the problematic label to the ML model; and retraining the ML model based on said providing.

In one embodiment of the foregoing method, the validating is performed a k number of iterations, wherein k is any positive integer, and wherein the confusion metric for each distinct pair of labels in the plurality of ML model-generated labels is aggregated across the k iterations.

A system is also described herein. The system includes at least one processor circuit; and at least one memory that stores program code configured to be executed by the at least one processor circuit, the program code comprising: a data fetcher configured to receive from a data store a plurality of data items and a user-generated label associated with each data item in the plurality of data items; and an artificial intelligence engine configured to: validate a machine learning (ML) model by: training the ML model using a first portion of the plurality of data items and the user-generated labels associated therewith; providing as input to the ML model a second portion of the plurality of data items; receiving from the ML model one of a plurality of ML model-generated labels for each data item in the second portion of the plurality of data items; and comparing the user-generated label associated with each data item in the second portion of the plurality of data items with the ML model-generated label associated with the same data item in the second portion of the plurality of data items; based on the validating of the ML model, determine a confusion metric for each distinct pair of labels in the plurality of ML model-generated labels; and based on the confusion metrics, identify one of the plurality of ML model-generated labels as a problematic label.

In one embodiment of the foregoing system, the plurality of data items comprises at least one of: e-mails; customer relationship management application-related messages; or support ticketing system-related messages.

In one embodiment of the foregoing system, the artificial intelligence engine is configured to identify the one of the plurality of ML model-generated labels as problematic by: identifying the one of the plurality of ML model-generated labels as being in conflict with another label of the plurality of ML model-generated labels.

In one embodiment of the foregoing system, the artificial intelligence engine is further configured to perform, responsive to identifying the one of the plurality of ML model-generated labels as problematic, merging the problematic label with the other label that is conflict with the problematic label; and retraining the ML model after said merging.

In one embodiment of the foregoing system, the artificial intelligence engine is configured to identify the one of the plurality of ML model-generated labels as problematic by: identifying the one of the plurality of ML model-generated labels as a relatively weak label such that other labels of the plurality of ML model-generated labels are predicted by the ML model instead of the one of the plurality of ML model-generated labels.

In one embodiment of the foregoing system, the artificial intelligence engine is further configured to perform, responsive to identifying the one of the plurality of ML model-generated labels as problematic, removing the problematic label; and retraining the ML model after said removing.

In one embodiment of the foregoing system, the artificial intelligence engine is configured to identify the one of the plurality of ML model-generated labels as problematic by: identifying the one of the plurality of ML model-generated labels as disturbing other labels of the plurality of ML model-generated labels such that the one of the plurality of ML model-generated labels is incorrectly predicted by the ML model instead of the other labels.

In one embodiment of the foregoing system, the artificial intelligence engine is further configured to perform, responsive to identifying the one of the plurality of ML model-generated labels as problematic, providing additional data items associated with the problematic label to the ML model; and retraining the ML model based on said providing.

A computer-readable storage medium having program instructions recorded thereon that, when executed by at least one processor of a computing device, perform a method. The method comprises: receiving from a data store a plurality of data items and a user-generated label associated with each data item in the plurality of data items; validating a machine learning (ML) model by: training the ML model using a first portion of the plurality of data items and the user-generated labels associated therewith; providing as input to the ML model a second portion of the plurality of data items; receiving from the ML model one of a plurality of ML model-generated labels for each data item in the second portion of the plurality of data items; and comparing the user-generated label associated with each data item in the second portion of the plurality of data items with the ML model-generated label associated with the same data item in the second portion of the plurality of data items; based on the validating of the ML model, determining a confusion metric for each distinct pair of labels in the plurality of ML model-generated labels; and based on the confusion metrics, identifying one of the plurality of ML model-generated labels as a problematic label.

In one embodiment of the foregoing computer-readable storage medium, the plurality of data items comprises at least one of: e-mails; customer relationship management application-related messages; or support ticketing system-related messages.

In one embodiment of the foregoing computer-readable storage medium, identifying the one of the plurality of ML model-generated labels as problematic comprises: identifying the one of the plurality of ML model-generated labels as being in conflict with another label of the plurality of ML model-generated labels.

VI. Example Embodiments

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method, comprising:
receiving from a data store a plurality of data items and a user-generated label associated with each data item in the plurality of data items;
validating a machine learning (ML) model by:
training the ML model using a first portion of the plurality of data items and the user-generated labels associated therewith;
providing as input to the ML model a second portion of the plurality of data items;
receiving from the ML model one of a plurality of ML model-generated labels generated by the ML model for each data item in the second portion of the plurality of data items; and
comparing the user-generated label associated with each data item in the second portion of the plurality of data items with the ML model-generated label associated with the same data item in the second portion of the plurality of data items;
based on the validating of the ML model, determining a confusion metric for each distinct pair of labels in the plurality of ML model-generated labels generated by the ML model, each confusion metric indicating a degree to which one label is being mistaken for the other label in the corresponding distinct pair of labels; and
based on the confusion metrics, identifying one of the plurality of ML model-generated labels as a problematic label.

2. The method of claim 1, wherein the plurality of data items comprises at least one of:
emails;
customer relationship management application-related messages; or
support ticketing system-related messages.

3. The method of claim 1, wherein identifying the one of the plurality of ML model-generated labels as problematic comprises:
identifying the one of the plurality of ML model-generated labels as being in conflict with another label of the plurality of ML model-generated labels.

4. The method of claim 3, further comprising performing, responsive to the identifying the one of the plurality of ML model-generated labels as problematic:
merging the problematic label with the other label that is conflict with the problematic label; and
retraining the ML model after said merging.

5. The method of claim 1, wherein identifying the one of the plurality of ML model-generated labels as problematic comprises:
identifying the one of the plurality of ML model-generated labels as a relatively weak label such that other labels of the plurality of ML model-generated labels are predicted by the ML model instead of the one of the plurality of ML model-generated labels.

6. The method of claim 5, further comprising performing, responsive to the identifying the one of the plurality of ML model-generated labels as problematic:
removing the problematic label; and
retraining the ML model after said removing.

7. The method of claim 1, wherein identifying the one of the plurality of ML model-generated labels as problematic comprises:

identifying the one of the plurality of ML model-generated labels as disturbing other labels of the plurality of ML model-generated labels such that the one of the plurality of ML model-generated labels is incorrectly predicted by the ML model instead of the other labels.

8. The method of claim 7, further comprising performing, responsive to the identifying the one of the plurality of ML model-generated labels as problematic:

providing additional data items associated with the problematic label to the ML model; and retraining the ML model based on said providing.

9. The method of claim 1, wherein the validating is performed a k number of iterations, wherein k is any positive integer, and wherein the confusion metric for each distinct pair of labels in the plurality of ML model-generated labels is aggregated across the k iterations.

10. A system, comprising:

at least one processor circuit; and at least one memory that stores program code that, when executed by the at least one processor circuit, perform operations, the operations comprising:

receiving from a data store a plurality of data items and a user-generated label associated with each data item in the plurality of data items; and validating a machine learning (ML) model by:

training the ML model using a first portion of the plurality of data items and the user-generated labels associated therewith;

providing as input to the ML model a second portion of the plurality of data items;

receiving from the ML model one of a plurality of ML model-generated labels generated by the ML model for each data item in the second portion of the plurality of data items; and comparing the user-generated label associated with each data item in the second portion of the plurality of data items with the ML model-generated label associated with the same data item in the second portion of the plurality of data items;

based on the validating of the ML model, determining a confusion metric for each distinct pair of labels in the plurality of ML model-generated labels generated by the ML model, each confusion metric indicating a degree to which one label is being mistaken for the other label in the corresponding distinct pair of labels; and based on the confusion metrics, identifying one of the plurality of ML model-generated labels as a problematic label.

11. The system of claim 10, wherein the plurality of data items comprises at least one of:

e-mails;

customer relationship management application-related messages; or support ticketing system-related messages.

12. The system of claim 10, wherein identifying the one of the plurality of ML model-generated labels as problematic comprises:

identifying the one of the plurality of ML model-generated labels as being in conflict with another label of the plurality of ML model-generated labels.

13. The system of claim 12, wherein the operations further comprise performing, responsive to identifying the one of the plurality of ML model-generated labels as problematic, merging the problematic label with the other label that is conflict with the problematic label; and retraining the ML model after said merging.

14. The system of claim 10, wherein identifying the one of the plurality of ML model-generated labels as problematic comprises:

identifying the one of the plurality of ML model-generated labels as a relatively weak label such that other labels of the plurality of ML model-generated labels are predicted by the ML model instead of the one of the plurality of ML model-generated labels.

15. The system of claim 14, wherein the operations further comprise performing, responsive to identifying the one of the plurality of ML model-generated labels as problematic, removing the problematic label; and retraining the ML model after said removing.

16. The system of claim 10, wherein identifying the one of the plurality of ML model-generated labels as problematic comprises:

identifying the one of the plurality of ML model-generated labels as disturbing other labels of the plurality of ML model-generated labels such that the one of the plurality of ML model-generated labels is incorrectly predicted by the ML model instead of the other labels.

17. The system of claim 16, wherein the operations further comprise: performing, responsive to identifying the one of the plurality of ML model-generated labels as problematic, providing additional data items associated with the problematic label to the ML model; and retraining the ML model based on said providing.

18. A computer-readable storage medium having program instructions recorded thereon that, when executed by at least one processor of a computing device, perform a method, the method comprising:

receiving from a data store a plurality of data items and a user-generated label associated with each data item in the plurality of data items;

validating a machine learning (ML) model by:

training the ML model using a first portion of the plurality of data items and the user-generated labels associated therewith;

providing as input to the ML model a second portion of the plurality of data items;

receiving from the ML model one of a plurality of ML model-generated labels generated by the ML model for each data item in the second portion of the plurality of data items; and comparing the user-generated label associated with each data item in the second portion of the plurality of data items with the ML model-generated label associated with the same data item in the second portion of the plurality of data items;

based on the validating of the ML model, determining a confusion metric for each distinct pair of labels in the plurality of ML model-generated labels generated by the ML model, each confusion metric indicating a degree to which one label is being mistaken for the other label in the corresponding distinct pair of labels; and based on the confusion metrics, identifying one of the plurality of ML model-generated labels as a problematic label.

19. The computer-readable storage medium of claim 18, wherein the plurality of data items comprises at least one of:
   e-mails;
   customer relationship management application-related messages; or
   support ticketing system-related messages.

20. The computer-readable storage medium of claim 18, wherein identifying the one of the plurality of ML model-generated labels as problematic comprises:
   identifying the one of the plurality of ML model-generated labels as being in conflict with another label of the plurality of ML model-generated labels.

\* \* \* \* \*